Oct. 27, 1936.  G. J. NASH ET AL  2,059,138
AUTO WHEEL JACK
Filed Nov. 4, 1935
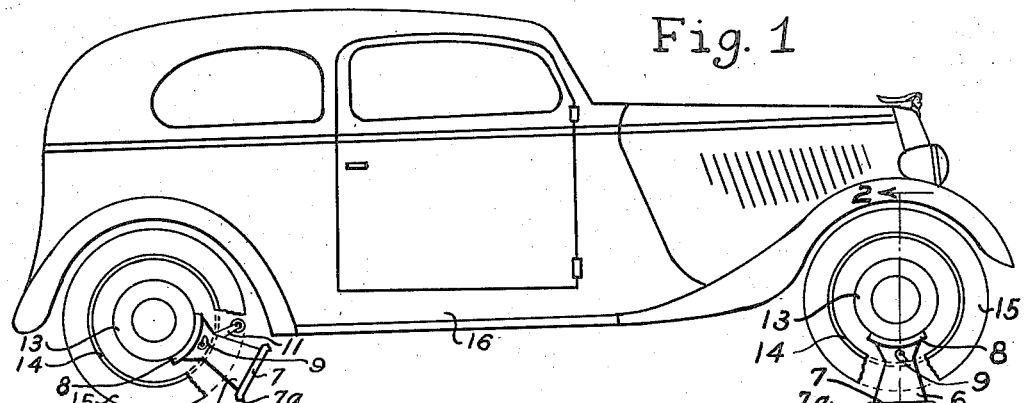
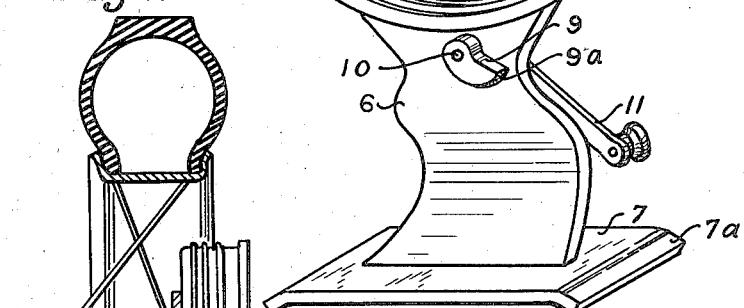
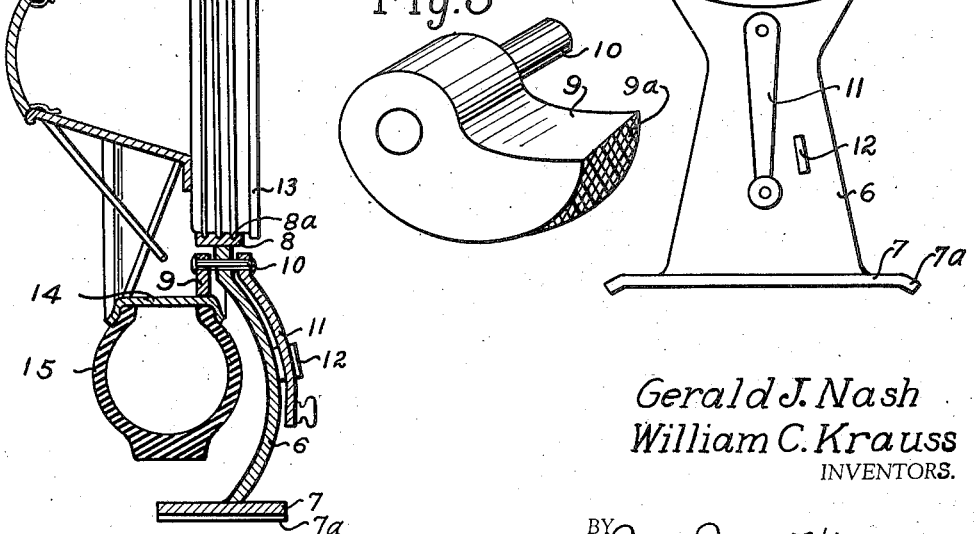
Gerald J. Nash
William C. Krauss
INVENTORS.
BY Van Buren Hillyard.
ATTORNEY.

Patented Oct. 27, 1936

2,059,138

UNITED STATES PATENT OFFICE 2,059,138

AUTO WHEEL JACK

Gerald J. Nash and William C. Krauss, Wichita Falls, Tex., assignors of thirty per cent to said Nash, thirty per cent to said Krauss, and forty per cent to C. A. Wickliffe Application November 4, 1935, Serial No. 48,251

5 Claims. (Cl. 254—94)

The invention provides a jack for lifting the wheels of vehicles, particularly such as are motor driven, which may be readily attached to and automatically released from the wheel without recourse to tools for the attainment of either end.

The invention is directed to the type of jacks operable by movement of the vehicle and relates chiefly to the attaching means for securing the jack when applied to the wheel to be lifted.

The invention contemplates a jack embodying a standard having a supporting base at one end provided with terminal calks, a load sustaining head at the opposite end for engagement with the vehicle brake drum, a dog pivoted to the standard and engageable with the wheel rim and adapted to coact with the head to secure the jack when applied to the wheel, and an arm connected with the dog to function as a counterweight and handle therefor.

While the drawing illustrates a preferred embodiment of the invention, it is to be understood that in adapting the same to meet specific needs and requirements, the design may be varied and changes in the minor details of construction may be resorted to within the scope of the invention as claimed, without departing from the spirit thereof.

For a full understanding of the invention and the merits thereof, reference is to be had to the following description and the drawing hereto attached, in which:

Figure 1 is a side view of a conventional automobile having jacks embodying the invention applied to the front and rear wheels, the front jack being vertical and the wheel elevated, and the rear jack inclined with the wheel resting, both wheels having a portion broken away for showing more clearly the relation of the parts.

Figure 2 is an enlarged sectional view on the line 2—2 of Figure 1.

Figure 3 is a perspective view of the jack.

Figure 4 is an elevational view of the jack.

Figure 5 is a detail perspective view of the dog and pivot.

Corresponding and like parts are referred to in the following description and designated in the several views of the drawing by like reference characters.

The vehicle 16 is shown to illustrate the application of the invention and represents a conventional automobile. The wheels are of approved form and embody a rim 14, tire 15 and brake drum 13.

The jack embodies a standard 6 having a substantial supporting base 7 at one end formed with terminal anti-slipping calks 7a and a head 8 at the opposite end to receive the brake drum 13. The standard is deflected between its ends to clear the rim and tire, as shown most clearly in Figure 2 of the drawing. The head 8 is depressed to conform to the brake drum 13 and is formed with parallel grooves 8a to receive ribs 13a of the brake drum to prevent lateral slipping of the jack.

The dog 9 is pivoted to the standard 6 adjacent the head 8, the pivot 10 being fast to the dog and mounted in a flat portion of the standard. The rim engaging face of the dog is knurled to prevent slipping and is curved to insure a cam action when in engagement with the rim 14. The pivot 10 projects beyond the opposite side of the standard and an arm 11 is secured thereto and extends in the same direction as the dog 9 and acts as an additional weight therefor, besides providing a handle for the manual operation of the dog when required. As shown in Figure 2, the arm 11 curves to conform to the outline of the standard 6. A stop 12 on the standard prevents an overthrow of the arm 11 and dog 9 when under stress of the load when the jack is in action.

In practice, when the jack is placed in position the head 8 receives the brake drum 13 and the dog 9 is engaged with the inner side of the rim 14. The combined weight of the dog 9 and arm 11 holds the jack in position. Movement of the vehicle 16 effects rotation of the wheel to which the jack is applied and as the jack shifts from the initial inclined position, shown at the rear in Figure 1, to vertical position, shown at the front in Figure 1, the wheel is lifted. The weight imposed on the jack causes the dog 9 to grip the rim 14 and the head 8 to bind against the brake drum 13, thereby securely holding the jack in place. The jack is automatically released by movement of the wheel to shift it from vertical to an inclined position, when the dog 9 and head 8 relax their hold, permitting the jack to fall away from the wheel.

Having thus described the invention, what we claim is:

1. A wheel jack of the character specified comprising a standard having a supporting base at one end and a head at the opposite end to engage the brake drum of a wheel, a rim engaging dog pivoted to the standard, and an arm connected with the dog and providing additional weight and an operating handle.

2. A wheel jack of the character specified comprising a standard having a supporting base at one end and a head at the opposite end to engage the brake drum of a wheel, a rim engaging dog pivoted to the standard, an arm connected with the dog and providing additional weight and an operating handle, and a stop on the standard to prevent overthrow of the dog and arm under stress of load.

3. A wheel jack of the character specified comprising a standard having a supporting base at one end and a head at the opposite end to engage the brake drum of a wheel, a pivot mounted in the standard adjacent the head, a dog at one side of the standard fast to the pivot, and an arm at the opposite side of the standard fast to said pivot.

4. A wheel jack of the character specified comprising a standard having a supporting base at one end and a head at the opposite end to engage the brake drum of a wheel, and deflected laterally between its ends, a pivot mounted in the standard adjacent the head, and an arm and dog at opposite sides of the standard extending in the same direction and fast to said pivot.

5. A wheel jack of the character specified comprising a standard having a supporting base at one end and a head at the opposite end to engage the brake drum of a wheel and deflected laterally between its ends, a pivot mounted in the standard adjacent the head, and an arm and dog at opposite sides of the standard extending in the same direction and fast to said pivot, said arm conforming to the outline of the standard, the latter having a stop to engage the arm and prevent overthrow thereof and the dog.

GERALD J. NASH.
WILLIAM C. KRAUSS.